(12) United States Patent
Wang

(10) Patent No.: US 7,310,394 B2
(45) Date of Patent: Dec. 18, 2007

(54) LMMSE-BASED RAKE RECEIVER WITH CHANNEL TAP ASSIGNMENT

(76) Inventor: Xiao-An Wang, 312 Alexander Dr., Allentown, PA (US) 18104

( * ) Notice: Subject to any disclaimer, the term of this patent is extended or adjusted under 35 U.S.C. 154(b) by 740 days.

(21) Appl. No.: 10/754,340

(22) Filed: Jan. 9, 2004

(65) Prior Publication Data

US 2005/0152486 A1    Jul. 14, 2005

(51) Int. Cl.
*H04B 1/10* (2006.01)
(52) U.S. Cl. ............... 375/350; 370/320; 370/335; 370/342; 370/441; 375/130; 375/144; 375/148; 375/150; 375/343; 455/137
(58) Field of Classification Search ............. 375/141, 375/144, 148, 150, 152, 343, 350; 455/137; 370/206, 441
See application file for complete search history.

(56) References Cited

U.S. PATENT DOCUMENTS

| | | | |
|---|---|---|---|
| 6,285,861 B1 * | 9/2001 | Bonaccorso et al. | 455/137 |
| 6,345,069 B1 * | 2/2002 | Dabak et al. | 375/152 |
| 6,618,433 B1 * | 9/2003 | Yellin | 375/148 |
| 2001/0028677 A1 | 10/2001 | Wang | |

OTHER PUBLICATIONS

Bottomley et al.; A generalized RAKE receiver for interference suppression; IEEE Journal on Selected Areas in Communications; vol. 18. No. 8; Aug. 2000; pp. 1536-1545.*

G. Fock, et al., "Channel Tracking for RAKE Receivers in Closely Spaced Multipath Environments", IEEE Journal on Selected Areas in Communications, vol. 19, No. 12, pp. 2420-2431, Dec. 2001.
Y.-P.E. Wang, et al., "The Benefits of Advanced Receivers for High Speed Data Communications in WCDMA", Proceedings of IEEE Vehicular Technology Conference, pp. 132-136, Sep. 2002.
G. Kutz and A. Chass, "On the Performance of a Practical Downlink CDMA Generalized RAKE Receiver", Proceedings of IEEE Vehicular Technology Conference, pp. 1352-1356, Sep. 2002.
A. Mirbagheri and Y.C. Yoon, "A Linear MMSE Receiver for Multipath Asynchronous Random CDMA With Chip Pulse Shaping", IEEE Trans. on Vehicular Technology, vol. 31, No. 5, pp. 1072-1086, Sep. 2002.

* cited by examiner

*Primary Examiner*—David C. Payne
*Assistant Examiner*—Adolf DSouza

(57) ABSTRACT

Methods of recovering data in a received signal sent in a communications media are disclosed. Composite channel impulse responses are first estimated. Channel-tap locations are then assigned to suppress the interference noises by sequential search schemes or heuristic search schemes based on estimated composite channel impulse responses. A sequential search scheme optimizes a predetermined design criterion in a sequential manner. Also described are recursive evaluations of the design criterion and the inverses of the noise covariance matrices based on the composite channel impulse response during a sequential search. A heuristic search scheme selects channel-tap locations based on a set of pre-selected channel-tap locations. The set of pre-selected channel-tap locations is determined according to the estimated composite channel impulse response. A method of estimating energy levels of known interference sources is also described.

22 Claims, 10 Drawing Sheets

LMMSE-BASED RAKE RECEIVER WITH CHANNEL TAP ASSIGNMENT

BACKGROUND

1. Field of Application

This invention relates to receiver design in communications systems, specifically to improving the system performance in terms of the bit error rate (BER) and frame error rate (FER), and to reducing the amount of computations and/or hardware in an effective and reliable manner.

2. Description of Prior Art

Conventional Rake Receiver

A direct-sequence code division multiple access (DS-CDMA) system typically employs a rake receiver to recover information sent over a communication medium (channel), e.g., air in wireless systems. A conventional rake receiver is based upon the concept of resolvable multipaths. Multipaths are typical of wireless channels where a mobile terminal (cell phone) receives multiple copies of the signals from a base station due to reflections from the surroundings. FIG. 1 illustrates the multiple-path phenomenon in a cellular system. A mobile terminal 20 communicates with a base station 22 in a cell 24 (base cell). In FIG. 1, there are a signal path 30a directly from base station 22, a signal path 30b reflected by a building 26, and a signal 30c reflected by a mountain 28. When the delays between the multipaths are large enough, the rake receiver is able to distinguish each multipath from others, and the multipaths in such a scenario are referred to as "resolvable multipaths". FIG. 2 illustrates a channel impulse response (CIR) seen by the rake receiver with three well-separated, or resolvable, multipaths.

A conventional rake receiver demodulates each multipath separately. In a conventional rake receiver, each multipath demodulator is referred to as a "finger". The receiver then combines the output of each finger to obtain the demodulated data.

A conventional rake receiver has following disadvantages:

1. Intracell interference degrades the output signal-to-noise ratio (SNR) of the rake receiver. Herein the SNR refers to both the signal-to-noise ratio and the signal-to-interference-plus-noise ratio (SINR) unless stated otherwise. When the rake receiver demodulates each multipath, it treats interferences of other multipaths as noise. Such noise is referred to as intracell interference. Intracell interference cannot be suppressed by increasing the input signal strength, since the strengths of all multipaths increases proportionally to the strength of the input signal. As a result, the output SNR of the rake receiver improves much more slowly with the increasing input SNR. Eventually the output SNR is limited by an SNR ceiling. FIG. 3 illustrates such an output SNR ceiling effect. The intracell interference severely limits the BER/FER performance, and the capacity of, e.g., wireless cellular systems.

2. Each finger of the receiver requires a dedicated tracking loop. The rake receiver uses the tracking loop to track the delay (timing) and complex amplitude of the multipath assigned to a finger. The tracking loops add complexity to the rake receiver. Herein the term "complexity" denotes any measure of a receiver with respect to the amount of computations, size of the software code, memory size, circuit size, gate count, silicon area, power consumption, cost, etc.

3. It is difficult to track closely spaced multipaths. If multipaths become close to each other, the outputs of the tracking loops will contain large errors, as the multipaths are no longer well separated as in FIG. 2. The estimation errors in timing and amplitude further degrade the BER/FER performance. Sophisticated algorithms can be used to track closely spaced multipaths, see, for example, G. Fock, et al., "Channel Tracking for Rake Receivers in Closely Spaced Multipath Environments", *IEEE Journal on Selected Areas in Communications*, vol. 19, no. 12, pp. 2420-2431, December 2001, incorporated by reference herein. Not only such algorithms significantly increase the complexity of the rake receiver, they also require a priori knowledge of information on delays and complex amplitudes for the multipaths to be tracked. Such information may not be available or can be hugely erroneous when estimated from closely spaced multipaths, thus degrading the performance of the tracking loops.

4. The quality of the initial multipath estimation is poor when the multipaths are closely spaced. As mentioned in previous paragraph, this has adverse effect on tracking algorithms. This also makes the finger assignment error-prone.

5. A conventional rake receiver based upon the resolvable multipath concept typically requires a sample rate that is four times (4×) the chip rate (the symbol rate of the spreading sequence) or higher, to reduce the penalty in signal-to-noise ratio (SNR) due to mis-alignment of the peak of a multipath and its corresponding sample point. Herein a sample rate which is four times the chip rate is referred to as 4× oversampling, and a sample rate which is two times the chip rate is referred to as 2× oversampling, and so on. For example, 2× oversampling results in about 0.5 dB SNR loss, while 4× oversampling reduces the SNR loss to about 0.1 dB. Higher sampling rate, however, increases the power consumption of the analog-to-digital converter (ADC) and front-end pulse-matched filter, if it is implemented digitally, which is undesirable especially in a mobile terminal that is power-limited.

Generalized Rake Receiver

A generalized rake receiver (G-rake) addresses the intracell interference problem in a conventional rake receiver. For details, see Y.-P. E. Wang, J.-F. Cheng and E. Englund, "The Benefits of Advanced Receivers for High Speed Data Communications in WCDMA", *Proceedings of IEEE Vehicular Technology Conference*, pp. 132-136, September 2002, incorporated by reference herein. In short, G-rake places more fingers than there are multipaths to provide better suppression of both intracell interference and intercell interference (interference from the base stations in other cells).

A G-rake receiver has following disadvantages:

1. G-rake receiver uses the multipath decomposition of the CIR, which makes it very sensitive to channel estimation errors. Let h(t) be the composite CIR, then the multipath decomposition of h(t) can be written as $$h(t) = \sum_{l=0}^{L-1} a_l p(t - \tau_l), \quad (1)$$

where $a_l$ and $\tau_l$ are the complex amplitude and delay of the l-th multipath, respectively, L is the number of multipaths, and p(t) is the waveform of the CIR when L=1. Herein the term "composite CIR" refers to the CIR h(t) in its entirety, as opposed to its multipath decomposition on the right hand side of Equation (1). G-rake uses the multipath decomposition to compute the noise covariance matrix that is needed in computing the optimum weights for combining the finger outputs. The multipath decomposition requires estimation of the complex amplitude and delay of each multipath, and thus is susceptible to channel estimation noise, especially when the multipaths are closely spaced. As a result, in real-world scenarios G-rake loses much of its promised performance gains that are predicted under the perfect knowledge of the channel. Details of the realistic G-rake performance can be found in, for example, G. Kutz and A. Chass, "On the Performance of a Practical Downlink CDMA Generalized Rake Receiver", *Proceedings of IEEE Vehicular Technology Conference*, pp. 1352-1356, September 2002, incorporated by reference herein.

2. Efficient and effective finger assignment algorithms have yet to be developed for a G-rake receiver. The performance of interference suppression depends strongly on the locations of additional fingers. The search for optimum locations of additional fingers, however, is computationally prohibitive. For example, each search step requires inversion of the noise covariance matrix. U.S. patent application Ser. No. 09/845, 950 to Y.-P. E. Wang, G. E. Bottomley and K. Urabe, discloses an iterative method in lieu of matrix inversion. The iterative method, however, is not guaranteed to converge. The solution given by a diverging iteration can severely degrade the receiver performance. The article of Y.-P. E. Wang, J.-F. Cheng and E. Englund, cited heretofore, discloses another finger assignment strategy that simply puts two additional fingers one chip before and after the known CIR. A heuristic search algorithm was proposed in the article of G. Kutz and A. Chass, cited heretofore, proposes a heuristic search algorithm ("Kutz and Chass scheme"). These finger assignment schemes, while simple, are not optimum, and thus can be ineffective in interference suppression, especially when the multipaths are closely spaced and the channel is severely dispersive.

3. Other disadvantages of a conventional rake receiver, such as the need for finger tracking and high sample rate, still exist in a G-rake receiver.

LMMSE Receiver

A linear-minimum-mean-square-error (LMMSE) receiver is typically designed based upon the composite CIR. A conventional LMMSE receiver has uniformly spaced taps, and the tap coefficients can be computed based on the composite CIR to minimize the mean output error energy. An LMMSE receiver is thus robust in the presence of the channel estimation errors. For details, see A. Mirbagheri and Y. C. Yoon, "A Linear MMSE Receiver for Multipath Asynchronous Random-CDMA with Chip Pulse Shaping", *IEEE Transactions on Vehicular Technology*, vol. 31, no. 5, pp. 1072-1086, September 2002.

A conventional LMMSE receiver has following disadvantages:

1. The number of uniformly spaced taps is much more than the number of taps (fingers) in a rake receiver, thus having more complexity.

2. To improve the performance, an LMMSE receiver will have fractionally-spaced taps, meaning more than one tap per chip. This further increases the complexity, and may be numerically unstable when the number of taps is large.

3. To obtain the optimum tap coefficients requires inversion of the noise covariance matrix. The dimension of the covariance matrix is the same as the number of taps, so this becomes comes impractical for large number of taps.

4. To avoid matrix inversion, an LMMSE receiver can be made to adapt to changes in CIR. The amount of computations in adaptive algorithms is often too huge to be practical. Adaptive algorithms also cause loss in performance.

SUMMARY OF THE INVENTION

The present invention relates to receiver design in communications systems, specifically to computationally efficient receiver implementations that effectively and reliably improve the BER/FER performance of communications systems.

In accordance with the present invention, an LMMSE-based rake receiver selects channel-tap locations based on the composite CIR. The present invention includes two types of channel-tap selection schemes: sequential search and heuristic search. A sequential search uses a recursive evaluation to efficiently select channel-tap locations, which yields a near-optimum performance while providing efficient implementations. A heuristic search has a very simple implementation, and in many cases has a performance comparable to that of a sequential search. Both types of channel-tap selection schemes provide substantial SNR gain over a conventional rake receiver. Use of the composite CIR makes the receiver robust in the presence of the channel estimation errors, and eliminates the need for tracking loops and high sample rates.

OBJECTS AND ADVANTAGES

Accordingly, several objects and advantages of the present invention are:

(a) to provide a receiver that has better and more stable BER/FER performance than existing rake receivers in the presence of interferences;

(b) to provide a receiver that maintains its performance in the presence of the channel estimation noise;

(c) to provide a receiver that eliminates the need for finger-tracking functions in existing rake receivers;

(d) to provide a receiver that has similar performances at 2× oversampling rate and at 4× oversampling rate;

(e) to provide a receiver that is power-efficient;

(f) to provide channel tap assignment schemes that select locations for channel taps in an efficient and effective manner to achieve optimum or near-optimum performance;

(g) to provide channel tap assignment schemes that keep the number of the channel taps as minimum as possible.

Further objects and advantages will become apparent from a consideration of the ensuing description and drawings.

BRIEF DESCRIPTION OF THE DRAWINGS

The present invention is best understood from the following detailed descriptions when read in connection with the accompanying drawings. In the drawings, like numbers refer to like elements. Included in the drawings are the following figures.

DETAILED DESCRIPTION

Figure 1:
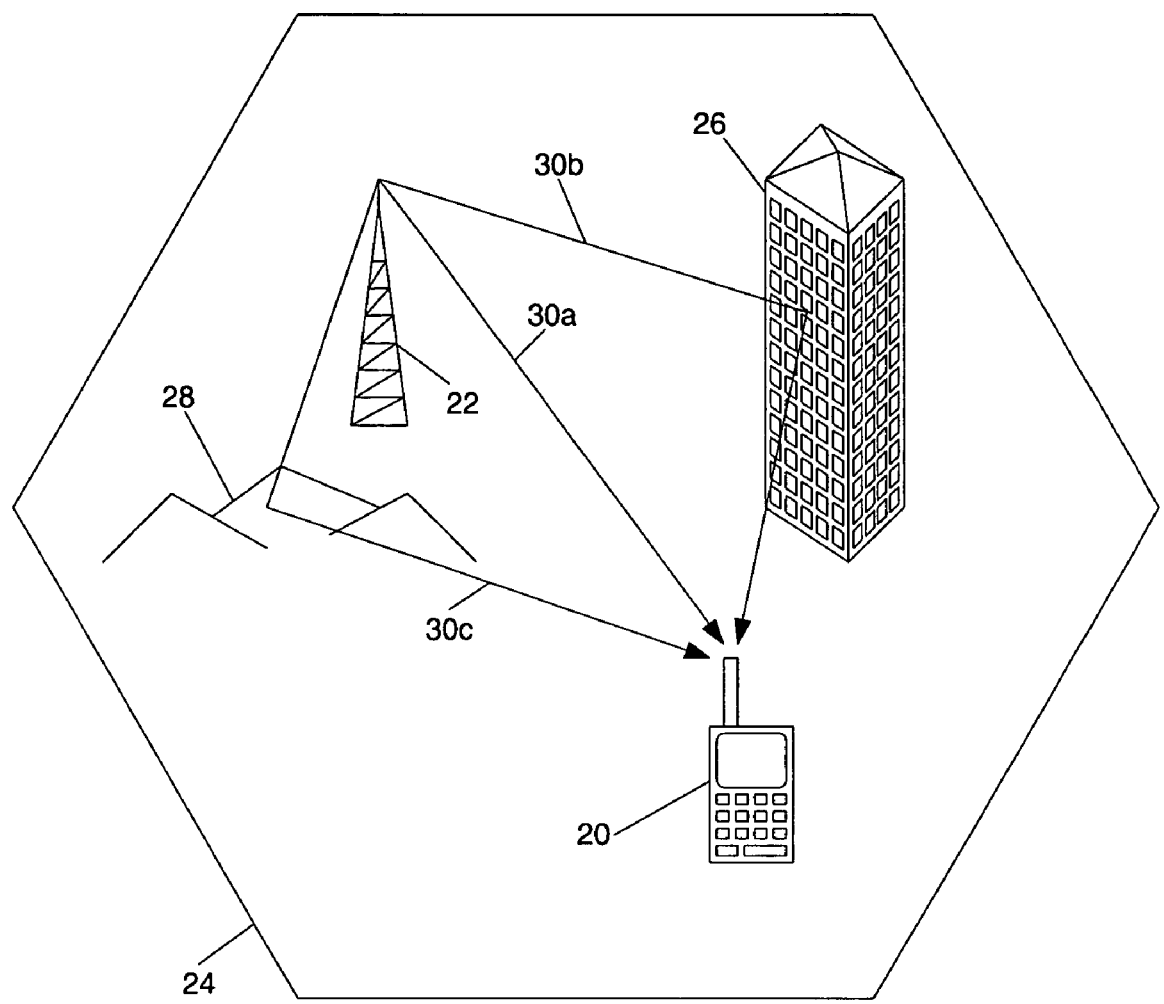
FIG. 1 illustrates the multipath phenomenon in a wireless cellular system.
Figure 2:
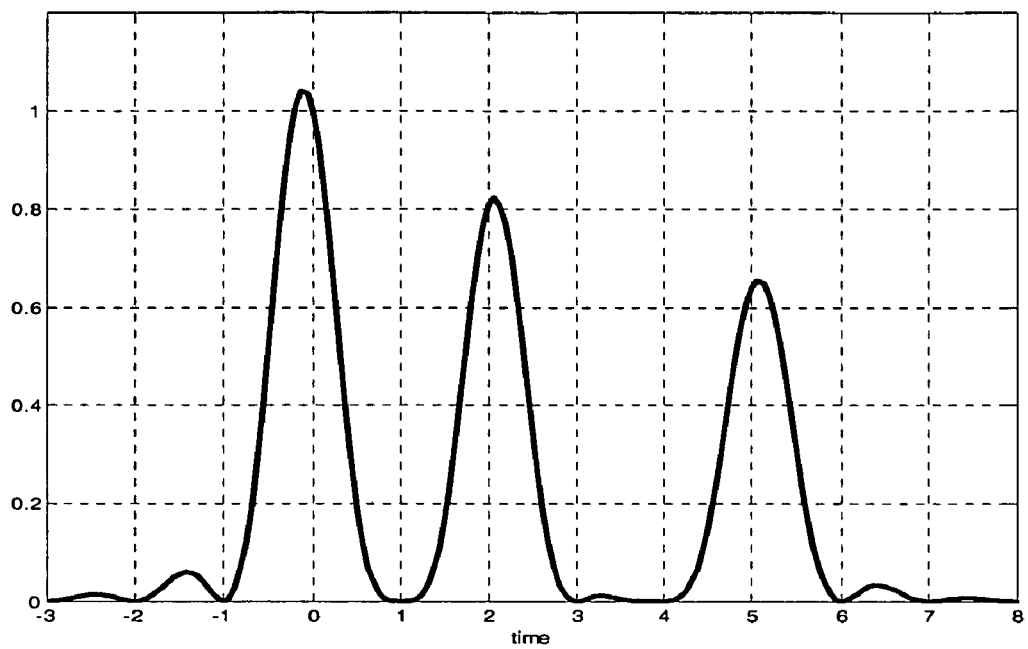
FIG. 2 illustrates a well-separated multipath channel impulse response seen by a rake receiver.
Figure 3:
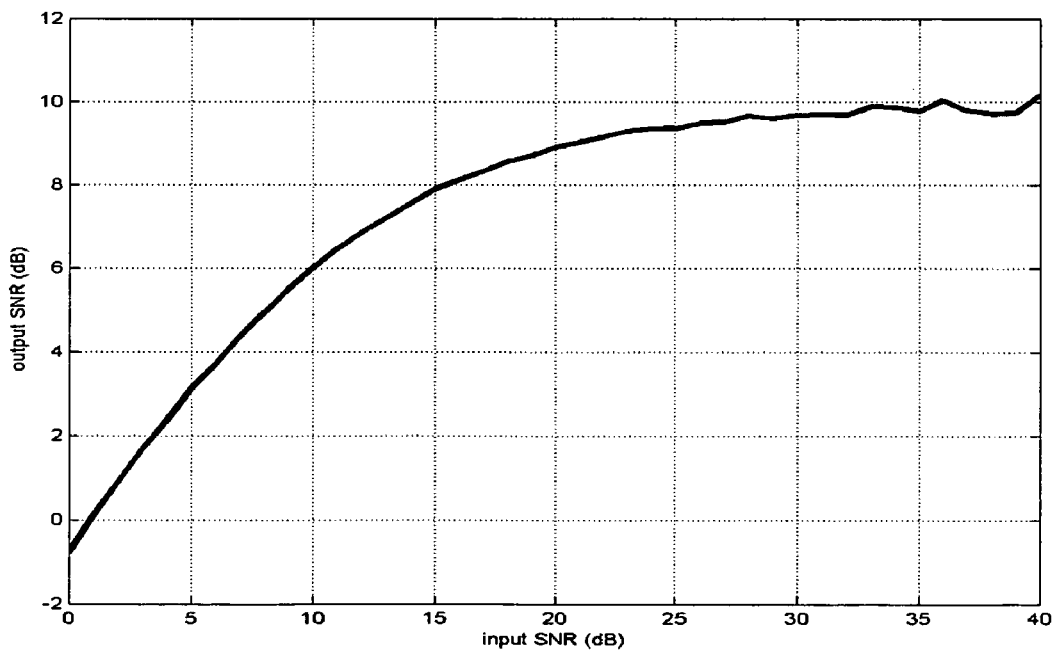
FIG. 3 illustrates the ceiling effect on the output SNR of a conventional rake receiver.

The present invention relates to the receiver design in communications systems. In a communications system, the receiver has means of estimating the composite CIR h(t). For example, in a wireless CDMA system, h(t) can be estimated from a pilot channel. It should be noted that estimating the composite CIR is entirely different from the multipath-based channel estimation used in conventional rake and G-rake receivers.

In conventional rake and G-rake receivers, channel estimation comprises multiple steps. First, the path searcher in the receiver searches for multipaths, generally at lower sampling rate, e.g., at 1× or 2× oversampling, in order to reduce the computation and power consumption. Once a multipath (finger) is detected at certain location, the tracker in the receiver will further refine the location of that multipath at higher sampling rate, e.g., 4× or 8×. The tracker is also responsible to estimate the complex amplitude of the multipath. Finally, since the location and complex amplitude of the multipath changes over time, the tracker need to track all the changes in the multipath. At any time instant, the receiver will use the output of the tracker, namely, locations and complex amplitudes of all detected multipaths as the estimated CIR.

The shortcomings of multipath-based channel estimation are well described in section "BACKGROUND—DESCRIPTION OF PRIOR ART". These shortcomings become more prominent when the multipaths are closely spaced, usually less than one chip. Such a scenario is typical in wireless cellular networks. In such cases, since the overlapping multipaths interfere with each other, their locations and complex amplitude cannot be accurately determined. When such an estimated CIR was used to compute noise covariance matrix, as illustrated in references of Wang and Kutz cited in heretofore, the estimation errors magnifies themselves in the computed values, resulting in significant performance degradation.

In contrast, the present invention estimates the composite CIR directly. Every sample point within the span of the composite CIR is used to provide the estimated value of the composite CIR at that sample point. This approach completely discards the notion of the "multipath", and thus avoids estimation of the locations and complex amplitudes of the multipaths, a crucial step for multipath-based channel estimation used in conventional rake and G-rake receivers. Consequently, the present invention completely eliminates the disadvantages of the multipath-based channel estimation, and substantially improves the performance. Since no underlying multipath is considered in the composite CIR, higher sampling rate, such as 4× or 8×, is unnecessary—there is no need to align the peak of a multipath with a sample point as closely as possible, which will conserve significant amount of power, a precious resource in a cellular handset. There also exist various techniques that make the estimation of the composite CIR very computationally efficient.

Assuming that the composite CIR is available, the noise covariance of the received signal can be derived. Given the channel-tap locations $t_0, t_1, \ldots, t_{M-1}$, let $h=[h_0, h_1, \ldots, h_{M-1}]^T = [h(t_0), h(t_1), \ldots, h(t_{M-1})]^T$ be the channel response vector. The received vector r with respect to the data symbol b can be written as $$r = hb + z, \quad (1)$$

where z is the noise vector. In a wireless CDMA cellular system, z can be modeled as the sum of the intracell interference and additive white Gaussian noise (AWGN), where the AWGN consists of the intercell interference and thermal noise. Consequently, the covariance matrix R of z can be written as $$R = R_{BC} + R_{AWGN}, \quad (2)$$

where $R_{BC}$ and $R_{AWGN}$ are the contributions to R from the intracell interference (the interference from the base cell, the base-cell component) and the AWGN, respectively. Given the channel-tap locations $t_0, t_1, \ldots, t_{M-1}$, let $h=[h_0, h_1, \ldots, h_{M-1}]^T = [h(t_0), h(t_1), \ldots, h(t_{M-1})]^T$ be the channel response vector. The received vector r with respect to the data symbol b can be written as $$r = hb + z, \quad (2)$$

where z is the noise vector. In a wireless CDMA cellular system, z can be modeled as the sum of the intracell interference and additive white Gaussian noise (AWGN), where the AWGN consists of the intercell interference and thermal noise. Consequently, the covariance matrix R of z can be written as $$R=R_{BC}+R_{AWGN}, \quad (3)$$

where $R_{BC}$ and $R_{AWGN}$ are the contributions to R from the intracell interference (the interference from the base cell, the base-cell component) and the AWGN, respectively.

The (i, j)-th element of $R_{BC}$ is proportional to the following quantity:

$$cov(z_i - z_j)_{BC} = E_{BC} \sum_{n \neq 0} h(t_i + nT_c)h^*(t_j + nT_c), \quad (4)$$

where $E_{BC}$ is the total received signal energy from the base cell (desired user signal energy+other user signal energy), and $T_c$ is the chip duration. Estimation of $E_{BC}$ will be described later.

Equation (4) is derived for a wireless CDMA cellular system with orthogonal spreading codes. For systems using random, non-orthogonal spreading codes, Equation (4) becomes $$cov(z_i, z_j)_{BC} = E_{BC} \sum_n h(t_i + nT_c)h^*(t_j + nT_c) - E_0 h(t_i)h^*(t_j), \quad (5)$$

where $E_0$ is the signal energy of the desired user.

The (i, j)-th element of $R_{AWGN}$ is proportional to the following quantity:

$$cov(z_i, z_j)_{AWGN} = N_0 g(t_i - t_j), \quad (6)$$

where $N_0$ is the single-sided power spectrum density of the thermal noise, and g(t) is the auto-correlation function of the impulse-response function of the front-end baseband filter. Estimation of $N_0$ will be described later.

It should be noted that the covariance expressions in Equations (4), (5) and (6) may differ from those used in various implementations by a constant scaling factor. The scaling factor is determined by the spreading factor, signal strength, path gains, etc.

The LMMSE receiver chooses a weight vector w so that the quantity $MSE = E[|w^H r - b|^2]$ is minimized. The superscript H denotes the Hermitian transpose. Such a weight vector is given by $$w = \alpha R^{-1} h \quad (7)$$

where α is a scaling factor. The MMSE is proportional to the following quantity:

$$\frac{1}{1 + \beta h^H R^{-1} h}, \quad (8)$$

where β is a scaling factor.

The weight vector can be also calculated to optimize other design criteria, such as maximum signal-to-interference-plus-noise-ratio (SINR). For linear receivers, the MMSE and maximum-SINR criteria give the same results.

Figure 4:
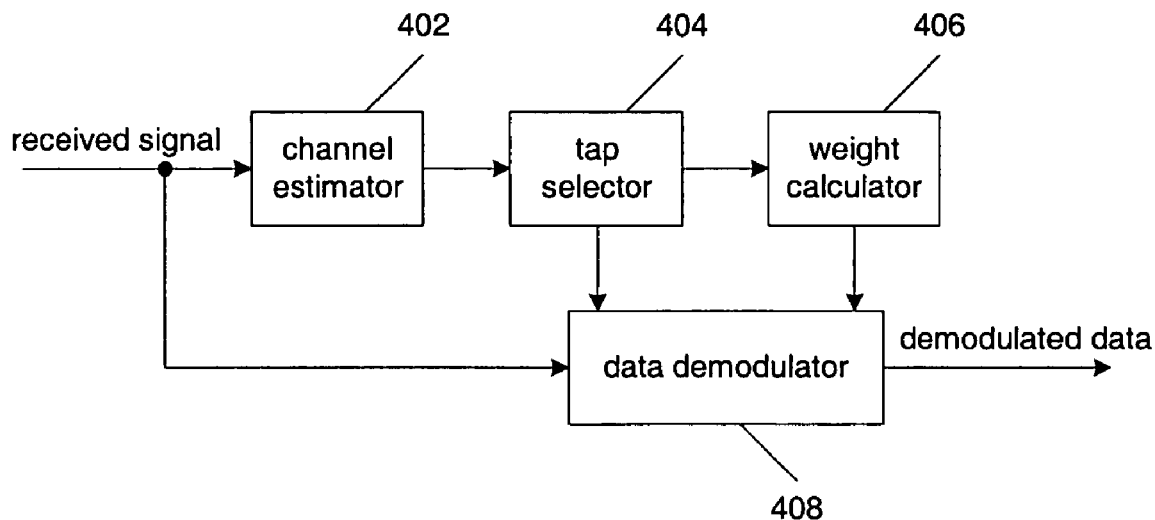
FIG. 4 illustrates an exemplary LMMSE-based rake receiver according to certain embodiments of the present invention.

FIG. 4 illustrates an exemplary receiver in accordance with certain embodiments of the present invention. A channel estimator 402 estimates the composite CIR from the received signal. A tap selector 404 selects channel-tap locations based on the composite CIR provided by channel estimator 402. Herein the term "channel-tap location" and the term "channel tap" are used inter-changeably so long as the meaning is clear in the context. A weight calculator 406 computes the weight vector using the output of tap selector 404. A data demodulator 408 recovers the information from the received signal using the channel-tap locations from tap selector 404 and the weight vector from weight calculator 406. In a wireless CDMA cellular system, data demodulator 408 consists of a correlator with the correlation timing determined by tap selector 404, and a combiner with the combining coefficients provided by weight calculator 406. Note that a correlator may consist of one to several physical hardware correlators.

The receiver in FIG. 4 is referred to as an LMMSE-based rake (L-rake) receiver. Typical applications of an L-rake receiver are wireless CDMA systems, just like a conventional rake receiver. An L-rake resembles a conventional LMMSE receiver in that (i) the weight vector in an L-rake receiver is designed based on the MMSE criterion and (ii) an L-rake receiver requires only the composite CIR instead of its multipath decomposition, which makes its performance very robust in the presence of the channel estimation errors.

An L-rake receiver also resembles a conventional rake receiver in that the channel taps (called "fingers" in a conventional rake receiver) are assigned according to the channel conditions, as opposed to the uniformly spaced channel taps in a conventional LMMSE receiver. When the channel does exhibit well-separated multipaths, the channel taps that would be selected by a conventional rake receiver will likely be selected by an L-rake receiver as well. An L-rake receiver, however, abandons the concept of resolvable multipaths altogether, and thus does not need finger-tracking loops.

Figure 5:
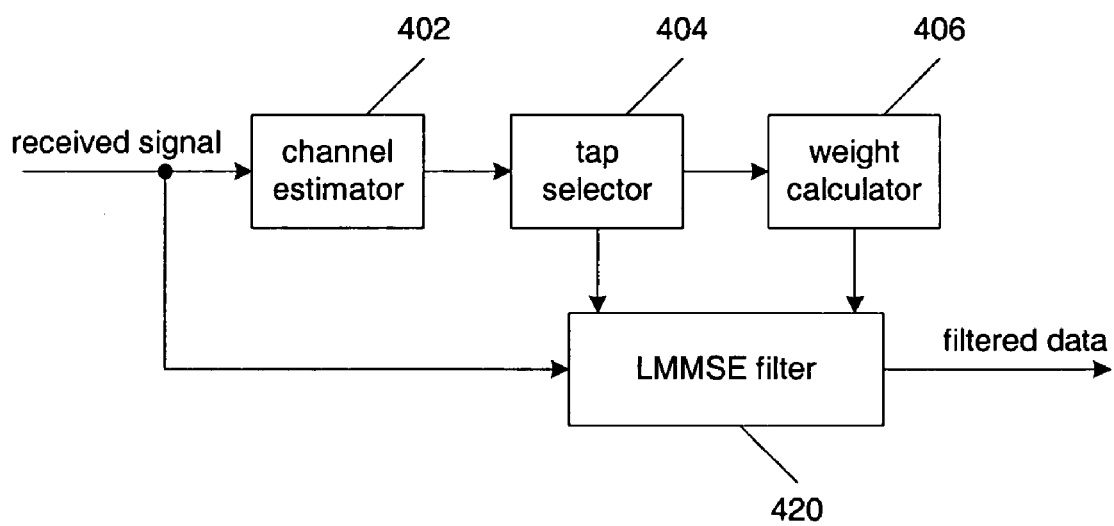
FIG. 5 illustrates an exemplary non-uniformly spaced LMMSE receiver according to other embodiments of the present invention.

In accordance with other embodiments of the present invention, a non-uniformly spaced LMMSE receiver replaces a data demodulator with an LMMSE filter. Such a receiver is a more general version of an L-rake receiver, and can also be used in other applications than wireless CDMA systems. FIG. 5 illustrates such a receiver. Channel estimator 402 estimates the composite CIR from the received signal. Tap selector 404 selects the filter-tap locations based on the composite CIR provided by channel estimator 402. Weight calculator 406 computes the filter coefficients using the output of tap selector 404. LMMSE filter 420 filters the received signal with the filter-tap locations determined by tap selector 404 and filter coefficients determined by weight calculator 406. The LMMSE receiver in FIG. 5 can operate at any fractional oversampling rate. A fractional oversampling rate refers to a sample rate that can be non-integer multiple of the symbol rate. Thus in addition to integral oversampling rates such as 2× or 4× oversampling, a fractional oversampling rate can be 3/2× oversampling, 4/3× oversampling, etc.

Channel Tap Assignment—Sequential Search

Given the total number of channel taps $N_T$, an optimum channel tap assignment would search over all combinations of $N_T$ channel-tap locations and choose the one that optimizes a pre-determined design criterion. Such an optimum search, however, is far from practical because of the huge number of combinations of the channel-tap locations, and amount of computations incurred. In contrast, a sequential search selects channel-tap locations one at a time. In a sequential search, a new channel tap is chosen that optimizes a design criterion given all previously chosen channel-tap locations. Thus the optimization in a sequential search is one-dimensional, as opposed to a multi-dimensional optimization problem in a full-blown optimum search.

A sequential search scheme for selecting the channel taps, which provides almost identical performance as an optimum search but can be implemented very efficiently, will be now described as follows. The sequential search begins with determining a search region. A search region is typically a contiguous region beyond which the energy of the composite CIR is negligible. Methods of determining the search region will be described in later.

The search is conducted over all sample points within the search region at, e.g., 2× or 4× oversampling rate. Assuming that there are n channel-tap locations that have been selected: $t_0, t_1, \ldots, t_{n-1}$. Let $h_n = [h_0, h_1, \ldots, h_{n-1}]^T = [h(t_0), h(t_1), \ldots, h(t_{n-1})]^T$ and $R_n$ be the corresponding noise covariance matrix. The objective here is to find the next tap $h_n = h(t_n)$ that minimizes the quantity in equation (8). From Equation (8), the MMSE is minimized when the quantity $$\gamma_{n+1} = h_{n+1}^H R_{n+1}^{-1} h_{n+1} \quad (9)$$

is maximized. Direct evaluation of Equation (9) requires inversion of the covariance matrix for each candidate channel tap. Matrix inversion of dimension n involves $O(n^3)$ operations. A more efficient approach is to use the following recursive evaluations:

$$\gamma_{n+1} = \gamma_n + \frac{|r_n^H R_n^{-1} h_n - h_n|^2}{\sigma_n^2 - r_n^H R_n^{-1} r_n} \quad (10)$$

and $$R_{n+1}^{-1} = \begin{bmatrix} R_n^{-1} + \frac{R_n^{-1} r_n r_n^H R_n^{-1}}{\sigma_n^2 - r_n^H R_n^{-1} r_n} & \frac{R_n^{-1} r_n}{\sigma_n^2 - r_n^H R_n^{-1} r_n} \\ \frac{r_n^H R_n^{-1}}{\sigma_n^2 - r_n^H R_n^{-1} r_n} & \frac{1}{\sigma_n^2 - r_n^H R_n^{-1} r_n} \end{bmatrix}, \quad (11)$$

where $\sigma_n^2 = \text{cov}(z_n, z_n)$ and $r_n = [\text{cov}(z_0, z_n), \text{cov}(z_1, z_n), \ldots, \text{cov}(z^{n-1}, z_n)]^T$ is called the new covariance vector. Recursive equations (10) and (11) make it explicit the dependence of $\gamma_{n+1}$ and $R_{n+1}^{-1}$ on the previously evaluated functions of previously chosen channel-tap locations and on the functions of the next channel-tap location $t_n$.

To maximize $\gamma_{n+1}$, the sequential search finds the next channel tap $h_n = h(t_n)$ to maximize the quantity $$\frac{|r_n^H R_n^{-1} h_n - h_n|^2}{\sigma_n^2 - r_n^H R_n^{-1} r_n} \quad (12)$$

in Equation (10) since $\gamma_n$ is independent of $h_n$. Evaluation of Equation (12) requires $O(n^2)$ operations. The recursive evaluation begins with $R_0^{-1} = \sigma_0^{-2} = \text{cov}(z_0, z_0)$ and $\gamma_1 = |h_0|^2 / \sigma_0^2$. The recursive evaluation avoids matrix inversion, and yet provides accurate results.

Using an approximate recursive evaluation may result in a still more efficient sequential search scheme. For example, the quantity $R_n^{-1} h_n$ in Equation (12) is independent of the new channel tap and so can be pre-computed for use in the evaluation of each candidate tap. If the term $r_n^H R_n^{-1} r_n$ in Equation (12) is dropped, the next channel tap can be chosen to maximize the quantity $$\frac{|r_n^H R_n^{-1} h_n - h_n|^2}{\sigma_n^2}, \quad (13)$$

which requires only O(n) operations. The performance difference between the exact sequential search and the approximate sequential search using Equation (13) is negligible in most cases.

The sequential search stops when the number of selected channel taps reaches the total number of taps $N_T$, which is typically determined by the hardware and other design constraints. Alternately, after each new channel tap is selected, the sequential search checks whether the new channel tap significantly improves the performance. If the performance is not improved noticeably, indicating more additional channel taps will be unlikely to generate large performance gains, the sequential search stops early, so the receiver uses as few channel taps as possible for satisfactory performance. The quantity in Equation (12) can be used for measuring the performance improvement. The sequential search can also stop early if Equation (10) reveals that a predetermined value of the design criterion has been met.

The sequential search can start with n=0. Alternately the search can start with $n=N_S$ with the first $N_S$ channel taps being pre-selected. This further reduces the amount of computations without degrading the performance, if the first $N_S$ taps have strong energy and are well separated. In particular, choosing the first tap with the maximum energy always maximizes, or nearly maximizes $\gamma_1$.

Figure 6:
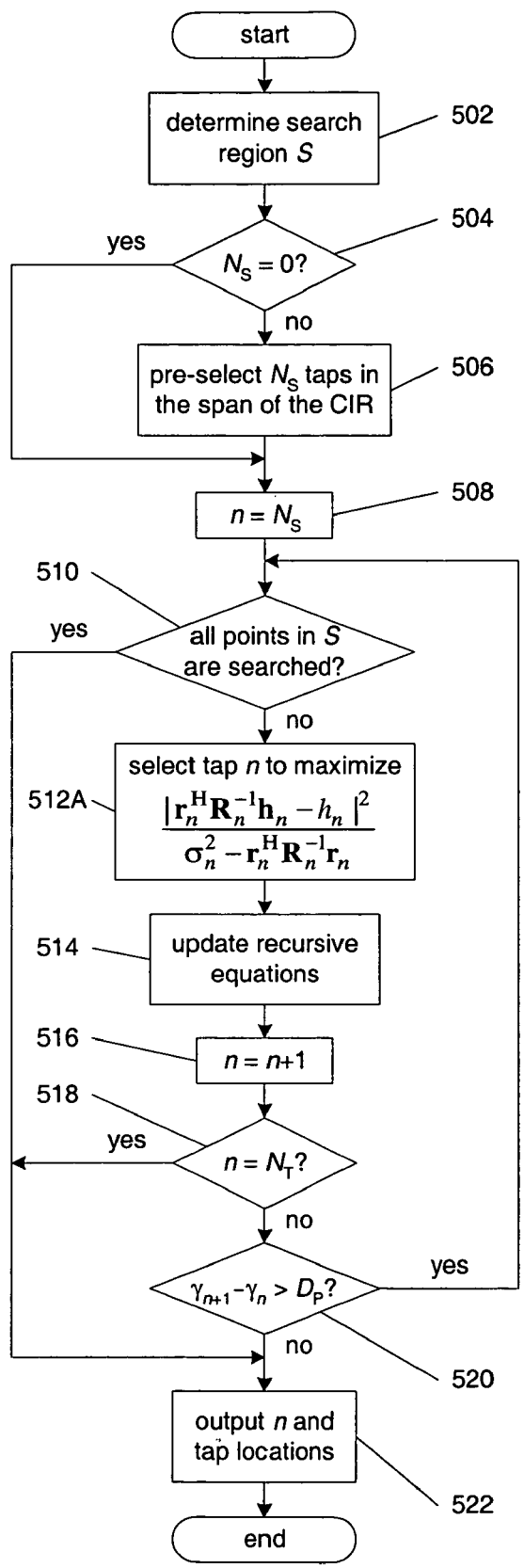
FIG. 6 illustrates an exemplary flowchart of sequential search operations of selecting channel-tap locations according to certain embodiments of the present invention.

FIG. 6 illustrates an exemplary flowchart of sequential search operations within tap selector 404 in FIG. 4 in accordance with certain embodiments of present invention. Operations in FIG. 6 start with step 502. Step 502 determines search region S. At step 504, a test compares if the number of channel taps to be pre-selected, $N_S$, is zero. $N_S$ can be determined, and supplied to the receiver, by the control functions of a communications system where the receiver is embedded. If the test at step 504 determines that $N_S$ is zero, operations proceed to step 508. If, however, the test at step 504 determines that $N_S$ is not zero, operations proceed to step 506. Step 506 pre-selects $N_S$ channel-tap locations, $t_0, t_1, \ldots, t_{N_S-1}$, in the span of the CIR. Herein the term "the span of the CIR" refers to a contiguous region $T_{CIR}$ beyond which the energy of the composite CIR is negligible. Note that $N_S$ may be updated at the end of step 506, depending on the actual number of pre-selected channel taps by step 506.

Step 508 sets a tap counter n to $N_S$. Step 510 checks if all sample points in search region S have been searched. If step 510 determines that all sample points in search region S have been searched, operations proceed to step 522. If, however, step 510 determines that not all sample points in search region S have been searched, operations proceed to step 512A. Step 512A selects tap n that maximizes Equation (12). Step 514 updates recursive equations (10) and (11) according to the result of step 512A. Step 516 increments the tap counter n by 1. At step 518, a test compares if the tap counter n has reached $N_T$. If the test at step 518 determines that the tap counter n reaches $N_T$, operations proceed to step 522. If, however, the test at step 518 determines that the tap counter n has not reached $N_T$, operations proceed to step 520. At step 520, a test compares if the difference in performance measurements, $\gamma_{n+1} - \gamma_n$, exceeds a threshold $D_P$. If the test at step 520 determines that the performance difference exceeds the threshold $D_P$, operations proceed to step 510. If, however, the test at step 520 determines that the performance difference does not exceed the threshold, operations proceed to step 522. Step 522 outputs the number and locations of the selected channel taps. The threshold $D_P$ will have no effect if it is set to be less than zero.

Figure 7:
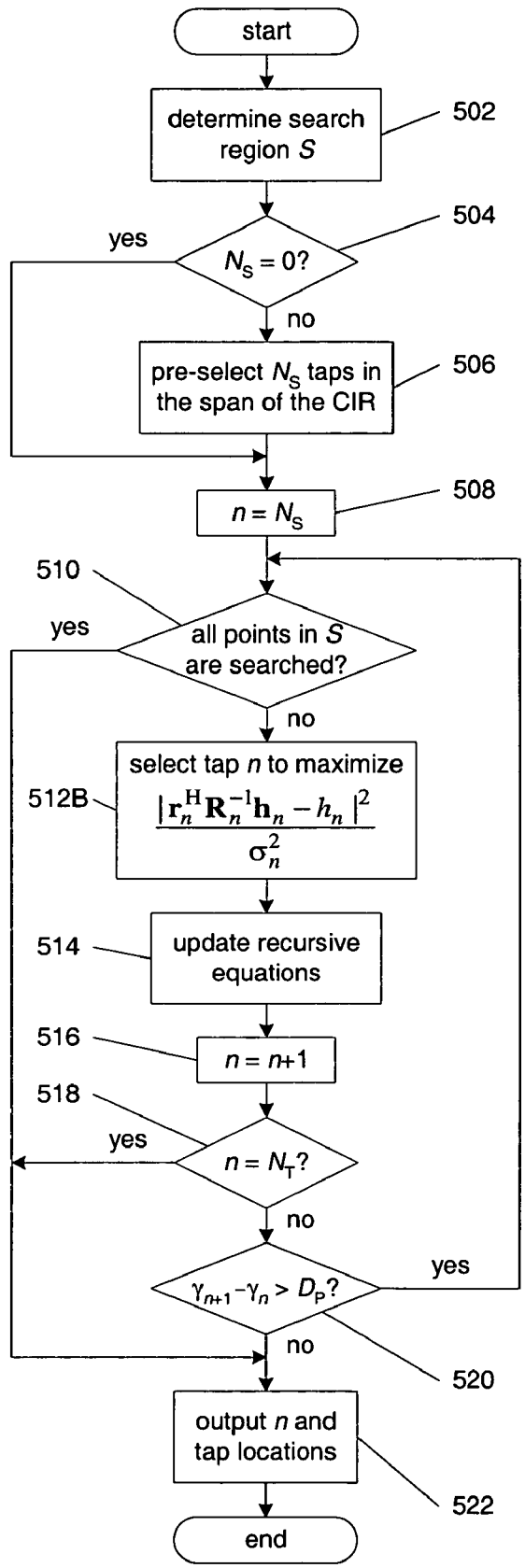
FIG. 7 illustrates another exemplary flowchart of sequential search operations of selecting channel-tap locations according to other embodiments of the present invention.

FIG. 7 illustrates another exemplary flowchart of sequential search operations within tap selector 404 in FIG. 4 in accordance with other embodiments of present invention. Operations in FIG. 7 are identical to the operations in FIG. 6, except that step 512B in FIG. 7 replaces step 512A in FIG. 6. Step 512B selects tap n that maximizes Equation (13).

The sequential search schemes in FIG. 6 and FIG. 7 can also incorporate additional algorithmic constraints. For example, the tap selection in step 512A or 512B can be restricted only to the locations the minimum distance of which to any previously selected channel-tap location is at least D. The reason for such a restriction is that closely spaced channel taps are not effective in suppressing the interference, and is highly sensitive to numerical errors. Thus the restriction helps in reducing the size of the sample points to be searched, and in improving numerical stability, especially at high oversampling rates, such as at 4× oversampling. In embodiment of the present invention, D is chosen to be an integer multiple of the sample intervals, such as $T_c$ or $T_c/2$ at 2× or 4× oversampling.

Pre-selection of Channel-Tap Locations

In some cases it is desirable to pre-select some channel-tap locations. The objective is to pre-select a number of strongest channel taps that satisfy certain distance constraint. Herein a strong channel tap refers to a channel tap with large energy.

Figure 8:
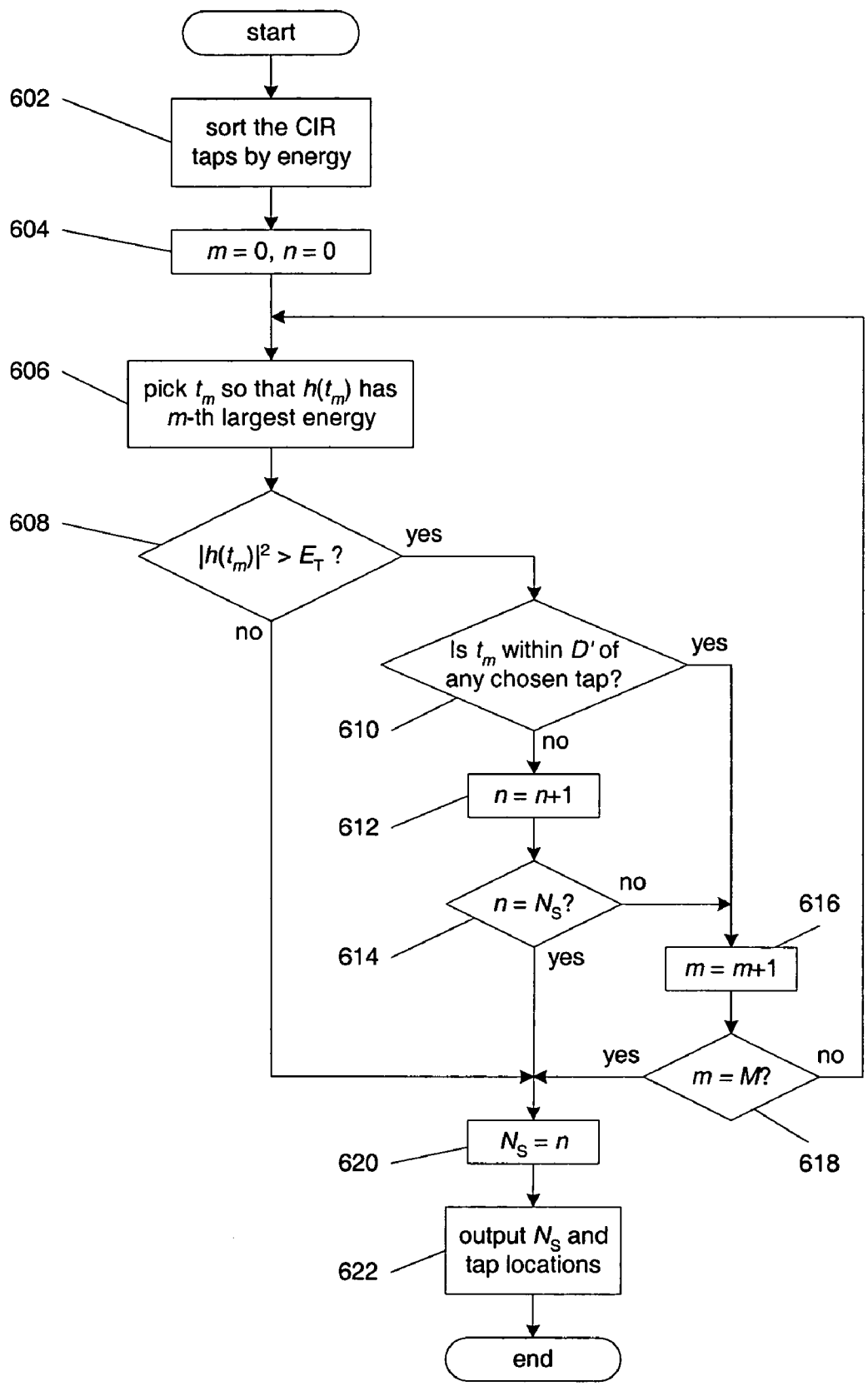
FIG. 8 illustrates an exemplary flowchart of operations of pre-selecting channel taps according to embodiments of the present invention.

FIG. 8 illustrates an exemplary flowchart of channel-tap pre-selection operations within step 506 in FIG. 6 in accordance with embodiments of present invention. Operations in FIG. 8 start with step 602. Step 602 sorts the composite CIR samples by their energy levels. Step 604 initializes a CIR sample counter m and a tap counter n to zero. Step 606 picks the tap location $t_m$ so that $h(t_m)$ has the m-th largest energy. At step 608, a test compares if the energy of $h(t_m)$ exceeds an energy threshold $E_T$. Step 608 ensures that pre-selection stops when there is no available candidate channel tap with large energy.

If the test at step 608 determines that the energy of $h(t_m)$ does not exceed the energy thresh-old $E_T$, operations proceed to step 620. If, however, the test at step 608 determines that the energy of $h(t_m)$ exceeds the energy threshold $E_T$, operations proceed to step 610. At step 610, a test examines if $t_m$ is within the distance D' of any previously selected channel-tap locations. Step 610 guarantees that the minimum distance between the pre-selected tap locations is at least D'. In embodiments of the present invention, D' is chosen to be an integer multiple of the sample intervals. D' will have no effect on pre-selection of channel-tap locations if it is set to be zero or less.

If the test at step 610 determines that $t_m$ is within the distance D' of a previously selected tap location, operations proceed to step 616. Step 616 increments the CIR sample counter m by 1. At step 618, a test compares if the CIR sample counter m has reached to M, the total number of CIR samples. If the test at step 618 determines that the CIR sample counter m has reached to M, operations proceed to step 620. If, however, the test at step 618 determines that the CIR sample counter m has not reached to M, operations proceed to step 606.

If, however, the test at step 610 determines that $t_m$ is not within the distance D' of any of the previously selected channel-tap locations, operations proceed to step 612. Step 612 increments the tap counter n by 1, admitting $t_m$ as the new tap location. At step 614, a test compares if the tap counter n reaches $N_S$. If the test at step 614 determines that the tap counter n has not reached $N_S$, operations proceed to step 616. If, however, the test at step 614 determines that the tap counter n reaches $N_S$, operations proceed to step 620.

Step 620 updates $N_S$ to be the actual number of the pre-selected tap locations. Step 622 outputs $N_S$ and the pre-selected channel-tap locations.

Note that if $N_S=1$, the receiver will simply choose a channel tap with largest energy. Some steps in FIG. 8, e.g., sorting, can be skipped.

Determination of the Search Region

Figure 9:
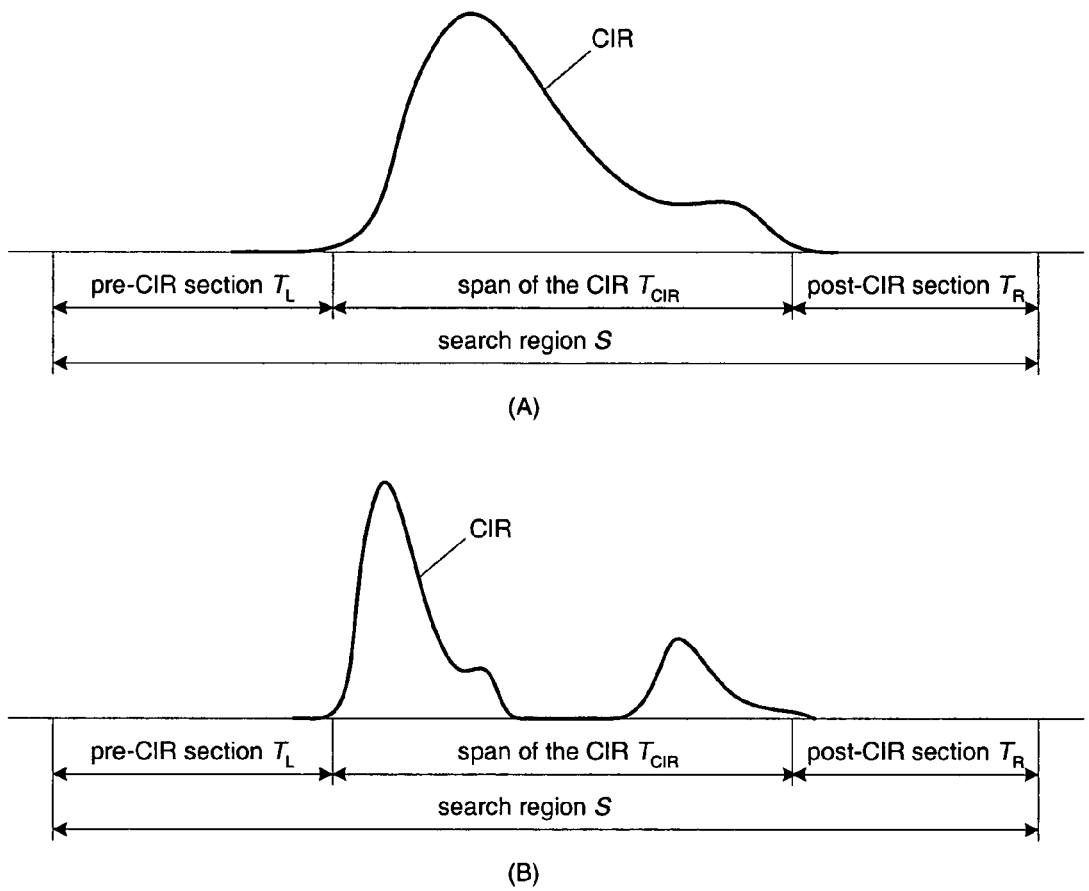
FIG. 9 illustrates a contiguous search region with respect to the span of the CIR according to embodiments of the present invention.

In accordance with embodiments of the present invention, a receiver selects a search region according to the span of the CIR. Typically a search region is a contiguous region that includes the span $T_{CIR}$ of the CIR. As defined previously, $T_{CIR}$ is a contiguous region beyond which the energy of the composite CIR is negligible. FIG. 9 illustrates search regions with respect to $T_{CIR}$ according to certain embodiments of the present invention. FIG. 9(A) and FIG. 9(B) make clear the definition of $T_{CIR}$ for various CIR shapes. More specifically, $T_{CIR}$ starts from the location where the energy of the composite CIR first become apparent, and ends at the earliest location after which the energy of the composite CIR is negligible. The energy of the composite CIR can be strong everywhere within $T_{CIR}$, as shown in FIG. 9(A). The energy of the composite CIR can be also zero or negligible in some part of $T_{CIR}$, as shown in FIG. 9(B). An energy threshold can be used to determine whether the energy of the composite CIR at a sample point is considered to be negligible.

In FIG. 9, a contiguous search region S consists of three sections: The span of the CIR $T_{CIR}$, the pre-CIR section $T_L$ and the post-CIR section $T_R$. In sections $T_L$ and $T_R$, the composite CIR is zero or has very small amplitudes. The channel taps in $T_L$ and $T_R$ help in reducing the interferences. The sizes of $T_L$ and $T_R$ generally depends on the shape of the composite CIR. Larger sizes of $T_L$ and $T_R$ result in better performance. In practical situations, however, most of the performance gain can be obtained with $T_L$ and $T_R$ being no larger than $T_{CIR}$.

Figure 10:
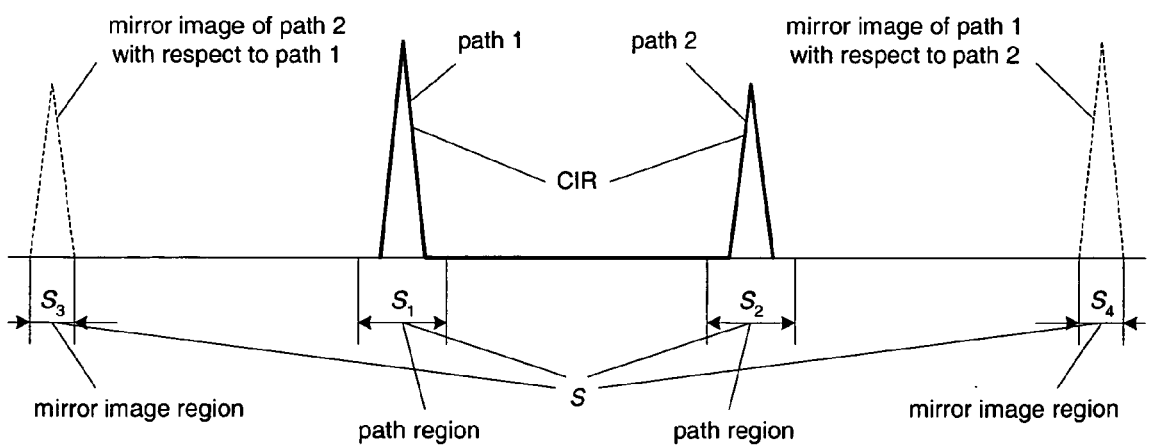
FIG. 10 illustrates a search region consisting of four disjoint sub-regions for a well-separated two-multipath channel according to one embodiment of the present invention.

If the composite CIR exhibits well-separated multipaths, the size of the search region can be reduced. FIG. 10 illustrates a search region for a two-multipath CIR according to one embodiment of the present invention. In FIG. 10, each path has its own search region referred to as "path region". Path region $S_1$ includes path 1 of the composite CIR and path region $S_2$ includes path 2 of the composite CIR. Region $S_3$ is the mirror image region of path 2 with respect to path 1. Region $S_4$ is the mirror image region of path 1 with respect to path 2. The total search region S is the union of regions $S_1$, $S_2$, $S_3$ and $S_4$.

The mirror region of a path with respect to another path (reflecting path) can be determined in several ways. A typical choice is to place the mirror region of a path in a location that is symmetrical to the strongest channel tap in the reflecting path.

While FIG. 10 illustrates a search region for a two-multipath CIR, a search region for a more-than-two-multipath CIR can be constructed similarly. In this case, the total search region S is the union of all path regions and mirror image regions.

Figure 11:
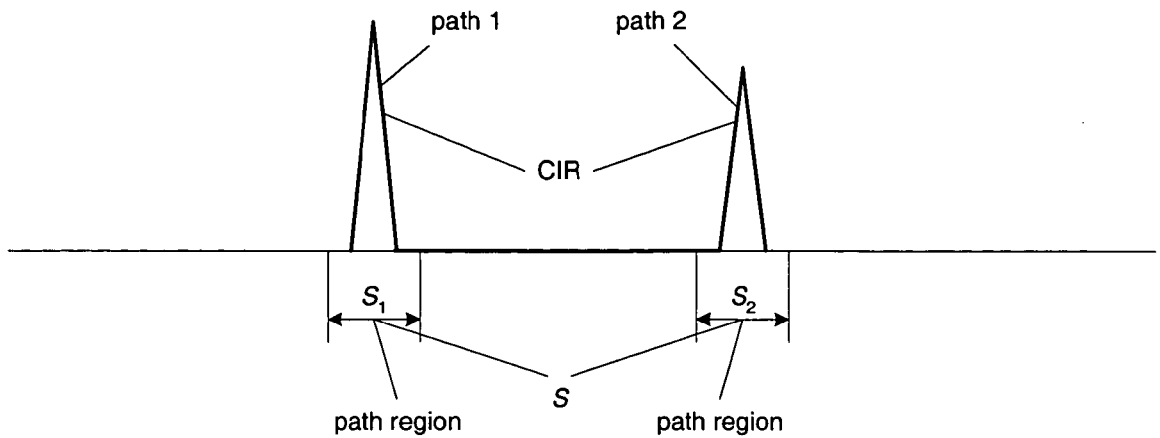
FIG. 11 illustrates a search region consisting of two disjoint sub-regions for a well-separated two-multipath channel according to another embodiment of the present invention.

FIG. 11 illustrates a search region for a two-multipath CIR according to another embodiment of the present invention. In FIG. 11, the total search region S consists of path regions $S_1$ and $S_2$ only.

Channel Tap Assignment—Heuristic Search

A heuristic search for selecting the channel taps is an alternative to the sequential search described previously. A heuristic search first pre-selects the channel taps in the span of the CIR to capture the signal energy. The heuristic search then proceeds to place additional channel taps at certain distances of the pre-selected taps to suppress the interference.

Figure 12:
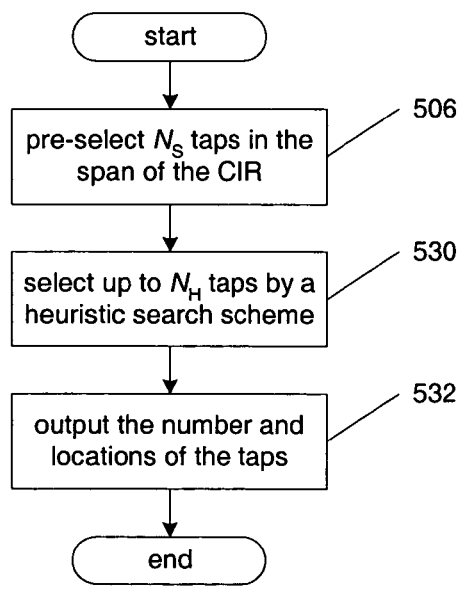
FIG. 12 illustrates an exemplary flowchart of heuristic search operations of selecting channel-tap locations according to embodiments of the present invention.

FIG. 12 illustrates a flowchart of operations of an exemplary heuristic search. Operations in FIG. 12 start with step 506. Step 506 pre-selects $N_S$ channel-tap locations, $t_0, t_1, \ldots, t_{N_S-1}$, in the span of the CIR. Step 530 uses a heuristic search scheme to select up to $N_H$ channel taps. Step 532 outputs the number and locations of the selected channel taps.

Figure 13:
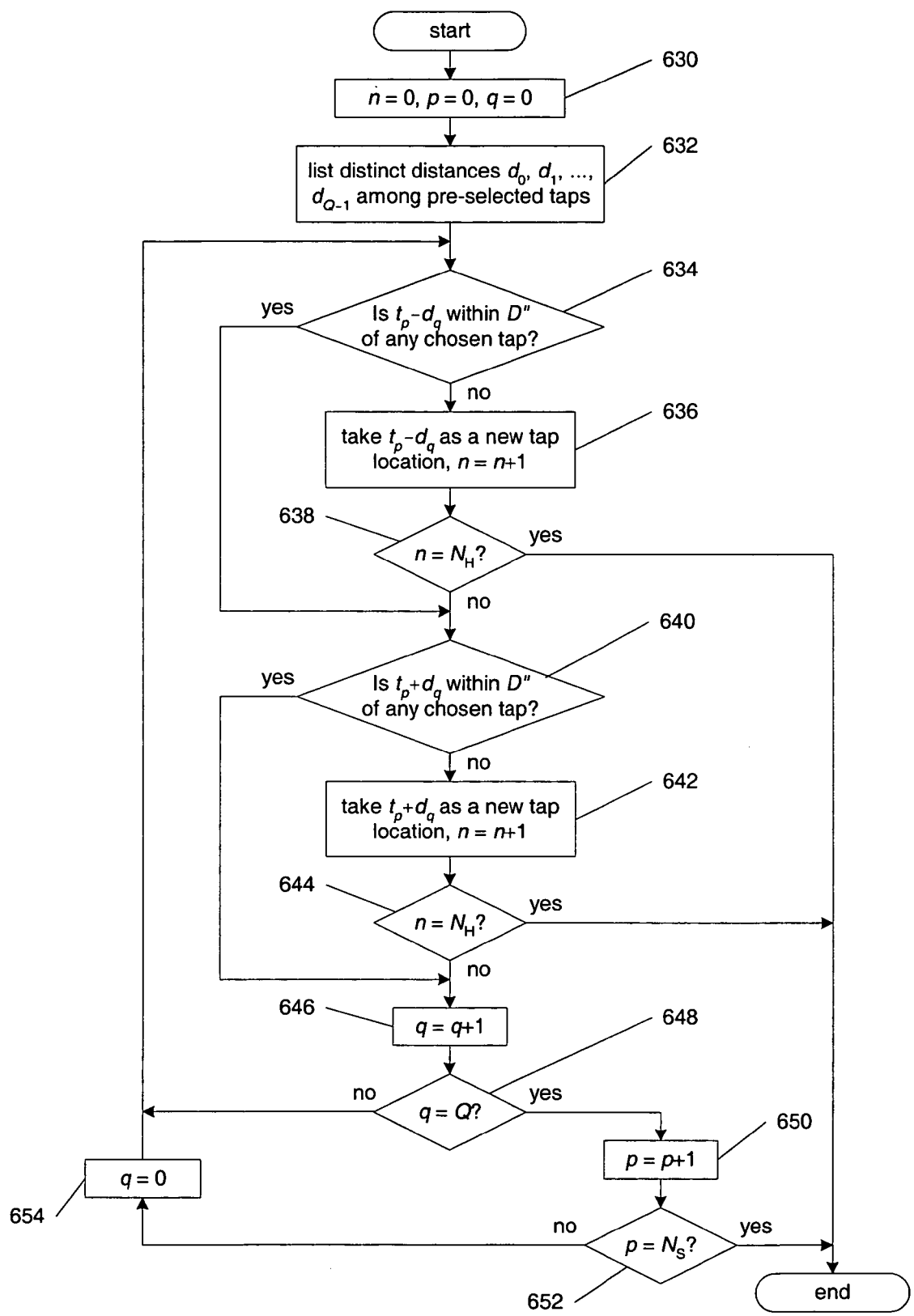
FIG. 13 illustrates an exemplary flowchart of operations of selecting channel-tap locations in a heuristic search scheme according to certain embodiments of the present invention.

FIG. 13 illustrates an exemplary flow chart of operations in a heuristic search scheme within step 530 in FIG. 12 according to certain embodiments of the present invention. Operations in FIG. 13 start with step 630. Step 630 initializes a tap counter n, a pre-selected tap counter p and a distance counter q to zero. Step 632 makes a Q-entry list of distinct distances $d_0, d_1, \ldots, d_{Q-1}$ among the pre-selected channel-tap locations. Step 634 considers if $t_p - d_q$ is within the distance D" of any already-chosen channel-tap location. If step 634 determines that $t_p - d_q$ is within the distance D" of an already-chosen channel-tap location, operations proceed to step 640. If, however, step 634 determines that $t_p - d_q$ is not within the distance D" of any already-chosen channel-tap location, operations proceed to step 636. In embodiments of the present invention, D" is chosen to be an integer multiple of the sample intervals.

Step 636 takes $t_p - d_q$ as a new channel-tap location, and increments the tap counter n by 1. At step 638, a test compares if the tap counter n reaches $N_H$, a predetermined number of allowed channel taps for the heuristic search scheme. If the test at step 638 determines that the tap counter n reaches $N_H$, the heuristic search is complete. If, however, the test at step 638 determines that the tap counter n has not reached $N_H$, operations proceed to step 640.

Step 640 considers if $t_p + d_q$ is within the distance D" of any already-chosen channel-tap location. If step 640 determines that $t_p + d_q$ is within the distance D" of an already-chosen channel-tap location, operations proceed to step 646. If, however, step 640 determines that $t_p + d_q$ is not within the distance D" of any already-chosen channel-tap location, operations proceed to step 642.

Step 642 takes $t_p + d_q$ as a new channel-tap location, and increments the tap counter n by 1. At step 644, a test compares if the tap counter n reaches $N_H$. If the test at step 644 determines that the tap counter n reaches $N_H$, the heuristic search is complete. If, however, the test at step 644 determines that the tap counter n has not reached $N_H$, operations proceed to step 646.

Step 646 increments the distance counter q by 1. At step 648, a test compares if the distance counter q reaches Q, the number of entries in the distance list. If the test at step 648 determines that the distance counter q has not reached Q, operations proceed to step 634. If, however, the test at step 648 determines that the distance counter q reaches Q, operations proceed to step 650.

Step 650 increments the pre-selected tap counter p by 1. At step 652, a test compares if the pre-selected tap counter p reaches $N_S$. If the test at step 652 determines that the pre-selected tap counter p reaches $N_S$, meaning that all pre-selected channel-tap locations have been considered by the heuristic search scheme for selecting additional channel-tap locations, the heuristic search is complete. If, however, the test at step 652 determines that the pre-selected tap counter p has not reached $N_S$, operations proceed to step 654. Step 654 resets the distance counter q to zero, and operations proceed to step 634.

The channel-tap locations selected by the heuristic search scheme in FIG. 13 have a property that the distance between a channel tap selected by the heuristic search scheme in FIG. 13 and a channel tap pre-selected by step 506 in FIG. 12 equals to the distance between a channel tap pair pre-selected by step 506 in FIG. 12. This is a special case of a more general heuristic search scheme by which the distance of a selected channel tap to any other channel tap, selected or pre-selected, equals to the distance between a pair of pre-selected channel taps.

Figure 14:
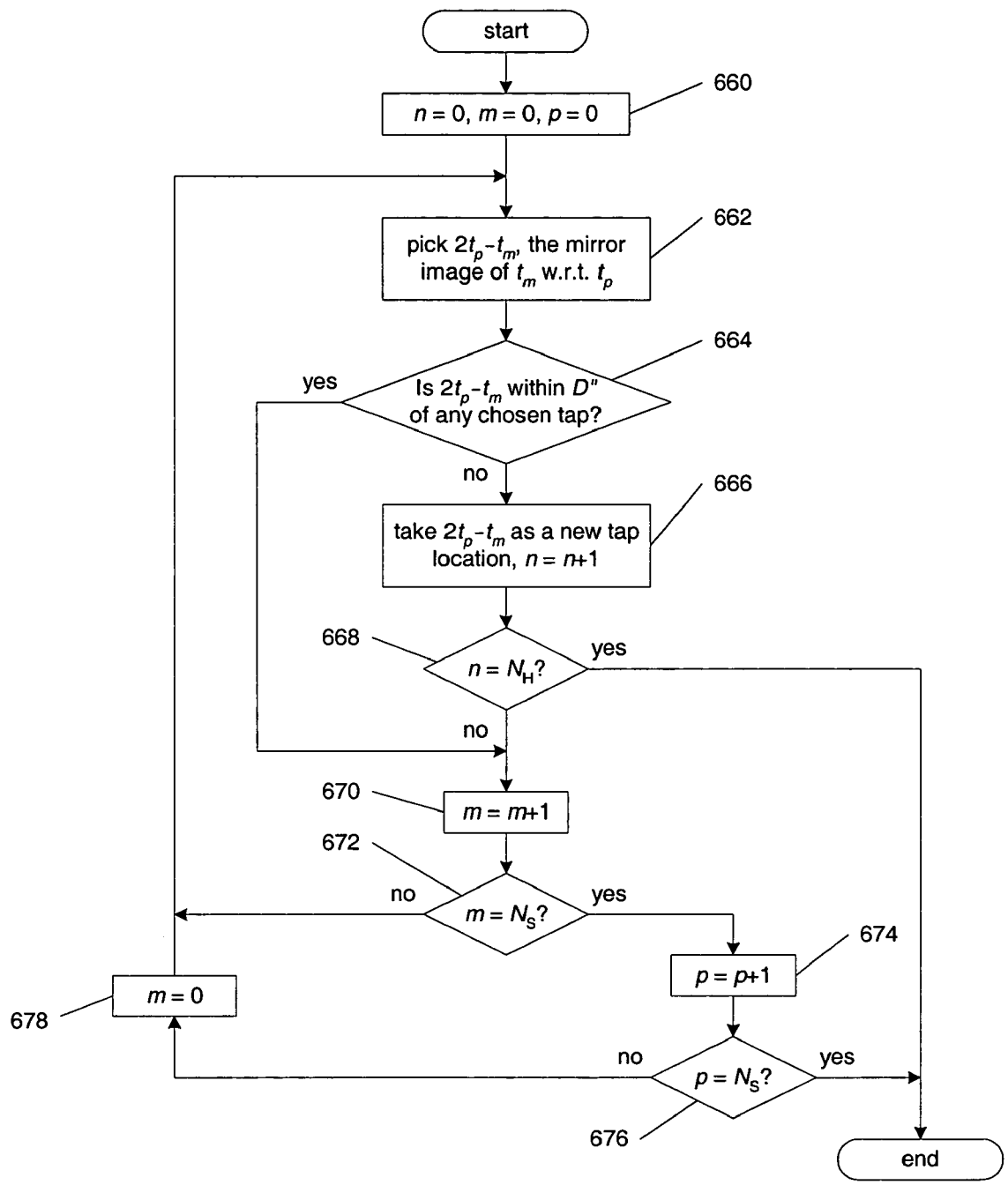
FIG. 14 illustrates an exemplary flowchart of operations of selecting channel-tap locations in another heuristic search scheme according to other embodiments of the present invention.

FIG. 14 illustrates an exemplary flow chart of operations in another heuristic search scheme within step 530 in FIG. 12 according to other embodiments of the present invention. Operations in FIG. 14 start with step 660. Step 660 initializes a tap counter n, a mirror image counter m and a pre-selected tap counter p to zero. Step 662 chooses a tentative channel-tap location $2t_p - t_m$, the mirror image of a channel-tap location $t_m$ with respect to a channel-tap location $t_p$. Step 664 considers if $2t_p - t_m$ is within the distance D" of any already-chosen channel-tap location. If step 664 determines that $2t_p - t_m$ is within the distance D" of an already-chosen channel-tap location, operations proceed to step 670. If, however, step 664 determines that $2t_p - t_m$ is not within the distance D" of any already-chosen channel-tap location, operations proceed to step 666.

Step 666 takes $2t_p - t_m$ as a new channel-tap location, and increments the tap counter n by 1. At step 668, a test compares if the tap counter n reaches $N_H$, a predetermined number of allowed channel taps for the heuristic search scheme. If the test at step 668 determines that the tap counter n reaches $N_H$, the heuristic search is complete. If, however, the test at step 668 determines mines that the tap counter n has not reached $N_H$, operations proceed to step 670.

Step 670 increments the mirror counter m by 1. At step 672, a test compares if the mirror counter m reaches $N_S$. If the test at step 672 determines that the mirror counter m has not reached $N_S$, operations proceed to step 662. If, however, the test at step 672 determines that the mirror counter m reaches $N_S$, meaning that all image locations of pre-selected channel-tap locations with respect to the pre-selected channel-tap location $t_p$ have been considered, operations proceed to step 674.

Step 674 increments the pre-selected tap counter p by 1. At step 676, a test compares if the pre-selected tap counter p reaches $N_S$. If the test at step 676 determines that the pre-selected tap counter p reaches $N_S$, meaning that all pre-selected channel-tap locations have been considered by the heuristic search scheme for selecting additional channel-tap locations, the heuristic search is complete. If, however, the test at step 676 determines that the pre-selected tap counter p has not reached $N_S$, operations proceed to step 678. Step 678 resets the mirror counter m to zero, and operations proceed to step 662.

The channel-tap locations selected by the heuristic search scheme in FIG. 14 have a property that any channel tap selected by the heuristic search scheme in FIG. 14 is the mirror image of a channel tap pre-selected by step 506 in FIG. 12 with respect to another channel tap pre-selected by step 506 in FIG. 12. This makes the heuristic search scheme in FIG. 14 a special case of the heuristic search scheme in FIG. 13.

The heuristic search scheme as appeared in FIG. 12 and FIG. 14 is similar in form to the Kutz and Chass scheme, in assigning additional channel taps. The main difference is that the present invention pre-selects the channel taps based solely upon the energy levels of the composite CIR channel taps, and thus discards the conventional practices of assigning channel taps according to the locations of the multipaths. This brings forth the benefits of not requiring the finger tracking, as well as the ability of operating on 2× oversampling. Another difference is that the present invention allows the minimum distance D" among the channel taps to be less than the one-chip minimum distance specified in Kutz and Chass scheme.

Modeling Intercell Interference

When the intercell interference, i.e., the interference from other surrounding cells, is strong, the performance can be improved if the intercell interference is modeled explicitly in the noise covariance. In such a case, Equation (3) becomes $$R = R_{BC} + R_{OC} + R_{AWGN}, \qquad (14)$$

where $R_{OC}$ and $R_{AWGN}$ are the contributions to R from the intercell interference (the interference from other cells, the other-cell component) and the thermal noise (the thermal-noise component), respectively.

The (i, j)-th element of $R_{OC}$ is proportional to the following quantity:

$$cov(z_i, z_j)_{OC} = \sum_{p=0}^{P-1} E_{OC,p} \sum_n h_{OC,p}(t_i + nT_c) h^*_{OC,p}(t_j + nT_c), \qquad (15)$$

where $E_{OC,p}$ and $h_{OC,p}(t)$ are the interference energy and the composite CIR of the p-th surrounding cell, respectively, and P is the number of surrounding cells, $h_{OC,p}(t)$ can be estimated from the pilot signal of the p-th surrounding cell. Estimation of $E_{OC,p}$ will be described later.

It should be noted that in typical wireless networks, the intercell interference is dominated by a very few, and often by only one, surrounding cells. The interference from non-dominating cells can be modeled as AWGN without causing performance loss. This reduces the number of the composite CIRs that need to be estimated and simplifies evaluation of the noise covariance matrix. When the intracell interference is dominant, all intercell interference can be modeled as AWGN without significant performance loss.

Pre-calculation of Noise Covariance Terms

During a sequential search, the new covariance vector $r_n$ is computed at each candidate tap, which involves evaluation of the covariance components defined in Equations (4), (6) and (15). For efficient implementations, the terms in those covariance equations can be pre-computed and stored so most of the covariance computations can be replaced by simple table accesses. The noise covariance can be decomposed into a one-dimensional part, a cyclostationary part, and a two-dimensional part. The covariance terms that can be pre-computed are described as follows.

Rewrite Equation (4) as $$cov(z_i, z_j)_{BC} = E_{BC} \sum_{n \neq 0} h(t_i + nT_c) h^*(t_j + nT_c) \qquad (16)$$

$$= E_{BC} \left( \sum_n h(t_i + nT_c) h^*(t_j + nT_c) - h(t_i) h^*(t_j) \right)$$

Define $$r_h(t_i, t_j) = \sum_n h(t_i + nT_c) h^*(t_j + nT_c) \qquad (17)$$

and $$r_{OC,p}(t_i, t_j) = \sum_n h_{OC,p}(t_i + nT_c) h^*_{OC,p}(t_j + nT_c). \qquad (18)$$

Functions $r_h(t_i, t_j)$ and $r_{OC,p}(t_i, t_j)$ are cyclostationary in that $r_h(t_i, t_j) = r_h(t_i + T_c, t_j + T_c)$ and $r_{OC,p}(t_i, t_j) = r_{OC,p}(t_i + T_c, t_j + T_c)$. The cyclostationary property allows each of $r_h(t_i, t_j)$ and $r_{OC,p}(t_i, t_j)$ can to be stored in several one-dimensional tables. For example, at 2× oversampling, $r_h(t_i, t_j)$ can be stored in two one-dimensional tables, and at 4× oversampling, $r_h(t_i, t_j)$ can be stored in four one-dimensional tables, and so on. Equation (6) requires a single one-dimensional table to store one-dimensional function g(t). The last term of Equation (16) remains two-dimensional, but it does not need to be pre-computed as it involves only one simple multiplication.

Evaluation of the noise covariance requires the knowledge of the composite CIR h(t). In regions where the amplitude of h(t) is small, h(t) can be approximated by zero. This reduces the length of the non-zero region of h(t), so the amount of computations is further reduced.

Energy Level Estimation

Estimation of the signal and noise energy levels $E_{BC}$, $E_{OC,p}$ and $N_0$ will be described as follows. Let y(t) be the received signal consisting of signals from the base cell and other cells, and the thermal noise. The autocorrelation function $r_{yy}(t, \tau)$ is given by $$r_{yy}(t, \tau) = E[y(t + \tau) y^*(t)]$$

$$= E_{BC} \sum_n h(t + \tau - nT_c) h^*(t + \tau - nT_c) +$$

$$\sum_{p=0}^{P-1} E_{OC,p} \sum_n h_{OC,p}(t + \tau + nT_c) h^*_{OC,p}(t + nT_c) + N_0 g(\tau)$$

$r_{yy}(t, \tau)$ can be computed directly from y(t) for a given timing pair (t, τ). Evaluating $r_{yy}(t, \tau)$ on a set of such timing pairs, Equation (19) gives a set of linear equations from which $E_{BC}$, $E_{OC,p}$ and $N_0$ can be solved for. The dimension of the linear equations should be at least P+2. Higher dimension (over-determined system) reduces the estimation error and improves the numerical stability.

The autocorrelation in Equation (16) is cyclostationary, and can be approximated by its time-average within one chip interval to produce the averaged autocorrelation that is one-dimensional.

Multiple Base Cells

When a mobile terminal receives from multiple base stations, such as during a soft handoff, the interference and noise in the signals from one base cell can be modeled to be uncorrelated with the interferences and noises in the signals from other base cells because each base cell uses a different scrambling sequence. The receiver assigns channel taps using a sequential search or a heuristic search, and computes the optimum weight vector for each individual base cell as described before. The outputs of the receiver for all base cells are then combined to minimize the overall output MSE or to maximize the overall output SNR.

Multiple Receive Antennas

When a receiver is equipped with multiple antennas receiving from a single cell, the interference and noise in the signals from one antenna are generally correlated with the interferences and noises in the signals from the other antennas. For the purpose of illustration, consider a receiver with two antennas. In this case, the two received signals will have two time-axes $t^{(1)}$ and $t^{(2)}$. The channel-tap locations consist of the channel-tap locations in $t^{(1)}$ axis and the channel-tap locations in $t^{(2)}$. The noise covariance between two channel-tap locations in the same time-axis remains in the same form as Equations (4), (6) and (15) with respect to the time-axis of interest. The covariance between two tap locations in different time-axes takes a slightly different form. For example, the base-cell component of the covariance can be written as $$cov(z_i^{(1)}, z_j^{(2)})_{BC} = E_{BC} \sum_{n \neq 0} h^{(1)}(t_i^{(1)} + nT_c) h^{*(2)}(t_j^{(2)} + nT_c), \quad (20)$$

where $h^{(1)}(t^{(1)})$ and $h^{(2)}(t^{(2)})$ are the composite CIRs of the two received channels. The other-cell component of the covariance can be modified similarly. The AWGN component of the co-variance is zero when two channel-tap locations are in different time-axes, assuming that the circuit noises in different antenna receive paths are uncorrelated.

The search process now includes assigning channel taps in both time-axis. Alternately the search may take a sub-optimal approach, assigning channel taps and calculating the weight vector in one time-axis at a time. The results from the two time-axes are then combined to generate the final output. Receivers with more than two receive antennas can be implemented in a similar fashion.

Conclusion, Ramifications, and Scope

Accordingly, it will be seen that the L-rake receiver of this invention combines the advantages of both LMMSE receivers and conventional rake receivers, without their disadvantages. Use of the composite CIR makes the receiver robust to channel estimation errors, so the receiver performance is largely unaffected by imperfect channel estimations. The channel tap assignment schemes eliminate the need for the knowledge of multipath locations, thus making the finger-tracking function in a conventional rake receiver unnecessary in the present invention. The present invention also eliminates the problem of initial finger assignment in the presence of closely spaced fingers.

A rake receiver typically requires much fewer taps than an LMMSE receiver does, since an LMMSE receiver typically uses equally spaced channel taps regardless of the channel conditions. Fewer taps reduces the receiver complexity and improves the numerical stability. An L-rake receiver retains this advantage of the rake receiver. The sequential search in an L-rake receiver places channel taps on optimum or close-to-optimum locations, so that the SNR performance is kept at optimum or near optimum level that is far better than the performance of a conventional rake receiver. Recursive evaluations of the design criterion and inverse of the noise covariance matrix make the sequential search highly efficient. Heuristic search provides another efficient approach to determining channel-tap locations.

An L-rake receiver works equally well at 2× and 4× oversampling rates since it does not depend on the knowledge of the multipath positions. Given that a conventional rake or a G-rake receiver typically works at 4× or higher oversampling, an L-rake receiver operating at 2× oversampling offers significant reduction in power consumption.

An L-rake receiver using a sequential search is able to maintain the fewest possible channel taps, since the channel tap assignment process can terminate early if the receiver finds a new channel tap does not yield significant performance improvement, or if the performance criterion has been met with fewer channel taps. Thus an L-rake receiver is able to keep the power consumption at minimum.

The advantages of the L-rake receiver allow it to be implemented efficiently in terms of hardware size, silicon area, amount of computations and power consumption. A more general form of an L-rake receiver, a non-uniformly spaced LMMSE receiver, extends the advantages of the L-rake to all applications where an LMMSE receiver is desired.

The present invention is disclosed in detail with wireless CDMA systems as illustrative examples. The principles of the present invention, however, also apply to other applications where an LMMSE receiver is employed.

The present invention can be embodied in the form of methods and apparatuses for practicing those methods. For example, the present invention can be embodied as circuits or digital hardware. The present invention can also be embodied in the form of program code stored in tangible media, such as floppy diskettes, hard drives, CD-ROMs, CD-R/Ws, DVDs, memories, or any other machine-loadable storage medium, wherein, when the program code is loaded into and executed by a machine, such as a general-purpose computer, digital signal processor, microprocessor, microcontroller, or any other processing circuit, the machine becomes an apparatus for practicing the invention.

It is to be understood that the embodiments and variations shown and described herein are merely illustrative of the principles of this invention and that various modifications may be implemented by those skilled in the art without departing from the scope and spirit of the invention as expressed in the following claims.

What is claimed is:

1. A method of recovering data in a received signal sent in a communications media, comprising:
   (a) estimating at least one composite channel impulse response from said received signal,
   (b) estimating a set of noise covariances based on said composite channel impulse response,
   (c) assigning a set of channel-tap locations by a sequential search based on said composite channel impulse response, with each said channel tap depending on said composite channel impulse response,
   (d) computing a set of weight coefficients for said set of channel-tap locations based on said composite channel impulse response, and
   (e) demodulating data in said received signal with said set of channel-tap locations and said set of weight coefficients.

2. The method of claim 1, wherein estimating said set of noise covariances based on said composite channel impulse response comprises:
   (a) decomposing said noise variance into a one-dimensional part, a cyclostationary part, and a two-dimensional part,
   (b) pre-computing and tabulating said one-dimensional part of said noise variance using a one-dimensional table,
   (c) pre-computing and tabulating said cyclostationary part of said noise variance using a plurality of one-dimensional tables,
   (d) accessing said one-dimensional tables to retrieve said one-dimensional part and said cyclostationary part of said noise covariance, and
   (e) computing said two-dimensional part of said noise covariance.

3. The method of claim 1, wherein said sequential search comprises:
   (a) determining a search region based on said composite channel impulse response,
   (b) pre-selecting a first set of channel-tap locations in said search region based on said composite channel impulse response, if said first set is predetermined to be non-empty, and
   (c) sequentially selecting a second set of channel-tap locations in said search region, based on said first set of channel-tap locations, to optimize a design criterion.

4. The method of claim 3, wherein said search region is a contiguous region comprising a span of said composite channel impulse response, a pre-composite-channel-impulse-response section, and a post-composite-channel-impulse-response section.

5. The method of claim 3, wherein said search region is a union of a set of path regions and a set of mirror image regions.

6. The method of claim 3, wherein pre-selecting said first set of channel-tap locations comprises choosing a number of strongest channel taps according to said composite channel impulse response, the distances among which are equal to or larger than a predetermined minimum distance.

7. The method of claim 3, wherein said design criterion is mean square error, whereby said mean square error is computed based on said composite channel impulse response.

8. The method of claim 3, wherein said design criterion is signal-to-noise ratio, whereby said signal-to-noise ratio is computed based on said composite channel impulse response.

9. The method of claim 3, wherein sequentially selecting said second set of channel-tap locations to optimize said design criterion comprises choosing a new channel-tap location that optimizes said design criterion based on a recursive evaluation that explicitly depends on:
   (a) a set of previously evaluated functions of all previously chosen channel-tap locations, and
   (b) a set of functions of said new channel-tap location, whereby said recursive evaluation can reduce the amount of computations.

10. The method of claim 9, wherein said recursive evaluation comprises:
    (a) a function of said design criterion,
    (b) a recursive equation of said function of said design criterion,
    (c) a difference between two consecutive recursion values of said function of said design criterion, which is to be optimized by said new channel-tap location, and
    (d) a recursive equation of a noise variance matrix.

11. The method of claim 3, wherein sequentially selecting said second set of channel-tap locations to optimize said design criterion comprises choosing a new channel-tap location that optimizes said design criterion based on an approximate recursive evaluation that explicitly depends on:
    (a) a set of previously evaluated functions of all previously chosen channel-tap locations, and
    (b) a set of functions of said new channel-tap location, whereby said approximate recursive evaluation can further reduce the amount of computations.

12. The method of claim 11, wherein said approximate recursive evaluation comprises:
    (a) a function of said design criterion,
    (b) a recursive equation of said function of said design criterion,
    (c) a simplified and approximate difference between two consecutive recursion values of said function of said design criterion, which is to be optimized by said new channel-tap location, and
    (d) a recursive equation of the inverse of a noise variance matrix.

13. The method of claim 3, wherein sequentially selecting said second set of channel-tap locations to optimize said design criterion can be terminated early before a predetermined number of channel-tap locations has been selected, if the difference between the value of said design criterion before a new tap is selected and the value of said design criterion after said new tap is selected is below a predetermined threshold.

14. The method of claim 1, wherein recovering data in said received signal sent in said communications media is performed at 2× oversampling.

15. A method of recovering data in a received signal sent in a communications media, comprising:
    (a) estimating at least one composite channel impulse response from said received signal,
    (b) estimating a set of noise covariances based on said composite channel impulse responses,
    (c) assigning a set of channel-tap locations by a heuristic search based on said composite channel impulse response, with each said channel tap depending on said composite channel impulse response,
    (d) computing a set of weight coefficients for said set of channel-tap locations based on said composite channel impulse response, and
    (e) demodulating data in said received signal with said set of channel-tap locations and said set of weight coefficients.

16. The method of claim 15, wherein said heuristic search comprises:
    (a) pre-selecting a first set of channel-tap locations based on said composite channel impulse response, and
    (b) selecting a second set of channel-tap locations in said search region by a heuristic search scheme based on said first set of channel-tap locations.

17. The method of claim 16, wherein pre-selecting said first set of channel-tap locations comprises choosing a number of strongest channel taps according to said composite channel impulse response, the distances among which are equal to or larger than a predetermined minimum distance.

18. The method of claim 16, wherein said heuristic search scheme comprises choosing a number of channel taps, where the distance of a thus-chosen channel tap to another thus-chosen channel tap or to a pre-selected channel tap equals to the distance between a pair of pre-selected channel taps.

19. The method of claim 16, wherein said heuristic search scheme comprises choosing a number of channel taps, where the distance between a thus-chosen channel tap and a pre-selected channel tap equals to the distance between a pair of pre-selected channel taps.

20. The method of claim 15, wherein recovering data in said received signal sent in said communications media is performed at 2× oversampling.

21. A method of recovering data in a received signal sent in a communications media, comprising:
(a) estimating at least one composite channel impulse response from said received signal,
(b) estimating a set of noise covariances based on said composite channel impulse responses,
(c) assigning a set of filter-tap locations by a sequential search, with each said filter tap depending on said composite channel impulse response,
(d) computing a set of filter coefficients for said set of filter-tap locations, and
(e) filtering said received signal with said set of filter-tap locations and said set of filter coefficients.

22. The method of claim 21, wherein recovering data in said received signal sent in said communications media is performed at a fractional oversampling rate.

* * * * *